United States Patent
Vaudry

[11] Patent Number: 5,353,542
[45] Date of Patent: Oct. 11, 1994

[54] APPARATUS AND METHODS FOR TRAPPING INSECTS

[76] Inventor: Alan Vaudry, 98-C Burnside Road West, Victoria, British Columbia, Canada, V9A 1B5

[21] Appl. No.: 23,937
[22] Filed: Feb. 25, 1993
[51] Int. Cl.⁵ .............................................. A01M 1/04
[52] U.S. Cl. ........................................ 43/113; 43/107; 43/114
[58] Field of Search .......................... 43/113, 114, 107

[56] References Cited

U.S. PATENT DOCUMENTS

| | | | |
|---|---|---|---|
| 1,009,580 | 11/1911 | Robinson | 43/113 |
| 4,566,220 | 1/1986 | Justice | |
| 4,686,789 | 8/1987 | Williams | 43/113 |
| 4,700,506 | 10/1987 | Williams | |
| 4,908,977 | 3/1990 | Foster | 43/107 |
| 4,962,611 | 10/1990 | Millard | 43/113 |
| 4,979,329 | 12/1990 | Olive | 43/113 |
| 5,029,411 | 7/1991 | Keenan | |
| 5,044,112 | 9/1991 | Williams | 43/113 |
| 5,142,815 | 9/1992 | Birdsong | 43/113 |

*Primary Examiner*—Kurt C. Rowan
*Attorney, Agent, or Firm*—Hughes, Multer & Schacht

[57] ABSTRACT

An insect trap comprising: a base portion having a trapping surface; adhesive material placed on the trapping surface; and a mounting structure for so mounting a light source above the trapping surface that fleas are attracted to the trapping surface and trapped by the adhesive means. The mounting structure extends over no more than 60%, and preferably between 25% and 40%, of the trapping surface. The flea trap also preferably comprises a mesh cover for covering the trapping surface in a manner that allows fleas to reach the trapping surface but prevents incidental contact therewith. A light cover is preferably provided to cover the light source, and the uppermost point on the light cover should be located no more than 3 inches above the trapping surface.

6 Claims, 4 Drawing Sheets

APPARATUS AND METHODS FOR TRAPPING INSECTS

TECHNICAL FIELD

The present invention relates to devices for trapping insects, and, more particularly, to apparatus and methods for trapping pestiferous insects, such as fleas, which feed on warm-blooded animals.

BACKGROUND OF THE INVENTION

The present invention is particularly useful when used to trap fleas, and that application will be discussed in detail below. However, in its broader form the present invention may be used to trap other insects; accordingly, the scope of the present invention should be determined not with reference to the following detailed discussion but instead with reference to the claims appended hereto.

Fleas are wingless, hard-bodied insects that feed on the blood of warm-blooded animals. Because of their predominance, two types of fleas are of primary interest. The cat flea (*Ctenocephalides felis*) is most commonly found on cats and dogs but also attacks humans. The human flea (*Pulex irritans*) employs humans as its primary host.

Fleas are carried by dogs, cats, and humans into human dwellings where they breed and multiply. At a minimum, the presence of fleas in the home is annoying because of the itching and irritation caused by a flea bite. Flea infestation can result in more serious problems, however, because fleas have the ability to transmit disease.

Numerous methods are commonly employed: (a) to prevent homes from becoming infested with fleas; and (b) to eliminate homes of fleas once they have become infested. For prevention and control, powders, sprays, dips, and collars for pets have been employed to kill fleas on pets or to repel fleas so that they do not stay on the pet and are thus not carried into the home. These prevention methods rely on toxic chemicals to kill or repel fleas. For elimination, sprays or aerosol "bombs" have been employed to kill fleas in the home. Bombs release toxic chemicals throughout the house to eliminate the fleas therein, while sprays are toxic chemicals sprayed on the floor of the house to kill fleas thereon; either or both of these elimination methods may be used in conjunction with the prevention methods just-discussed.

However, any protection provided by methods employing chemicals is short-lived because such chemicals quickly break down over time. Further, toxic chemicals can result in toxic and subtoxic reactions in animals and humans exposed thereto.

It is thus desirable to develop methods and apparatus for trapping and killing fleas in the home which do not rely on the use of toxic chemicals and which have a long-term effect.

PRIOR ART

It has long been known that many insects, including fleas, are attracted to light. This knowledge has been employed to design devices for controlling insects in which light is employed to attract insects to a location where they are trapped and/or killed. The following U.S. Patents are examples of such devices: (1) U.S. Pat. No. 4,566,220 issued Jan. 28, 1986 to Justice; and (3) U.S. Pat. No. 4,700,506 issued Oct. 20, 1987 to Williams.

Additionally, the Applicant is aware of a flea trap sold under the trade name THE TERMINATOR by Dasko Harware Products, Inc. of Ontario, Canada.

The Justice patent discloses a flea trap that employs direct and reflected green light to attract fleas to a pan containing a sticky substance which traps the fleas. The green light is mounted in a cover that is suspended by legs over the pan containing the sticky substance. The cover covers a substantial portion of the pan and is spaced from 3 to 5 inches above the pan. The overall height of the trap disclosed in Justice is thus relatively large, rendering it incapable of being placed in many desirable unobtrusive places such as under furniture. This is a serious defect as the flea trap must be placed wherever the fleas congregate.

The Dasko product referred to above is essentially the same as the trap described in the Justice patent but employs a clear red light bulb.

The flea trap disclosed in the Williams patent is also essentially the same as that shown in the Justice patent. The primary differences being the shape of the pan and cover (rectangular rather than round) and the method of assembly/disassembly. The cover covers the entire pan in Williams, and the distance between the pan and cover of the Williams flea trap is from 3 to 6 inches, resulting in a trap at least as large and obtrusive as the Justice trap.

Additionally, the Justice and Williams flea traps, which are disassembled for shipping and then erected by the user, are difficult to erect and rather flimsy when erected.

Further, the Justice and Williams patents specifically teach the use of a green light. While scientific studies have shown that a green-yellow light having a wavelength of between 510 and 550 nanometers is especially attractive to cat fleas, a green light such as that employed by these patents is less effective at attracting fleas than a clear light.

OBJECTS OF THE INVENTION

In view of the foregoing, it is apparent that an important object of the present invention is to provide improved apparatus and methods for trapping insects such as fleas.

Another important, but more specific, object of the present invention is to provide such apparatus and methods having a favorable mix of the following factors:

a. low manufacturing and assembly costs;
b. small and compact in size;
c. durable;
d. does not require user assembly;
e. offers increased efficacy over other traps currently available.

SUMMARY OF THE INVENTION

These and other objects are achieved by the present invention, which is basically a flea trap having an upper portion and a lower portion. A light source is mounted in the upper portion to attract fleas and a sticky substance is placed on the lower portion to trap fleas so attracted. The upper portion covers, or lies directly above, only a relatively small portion of the lower portion. The relatively small portion may be numerically defined as follows: the upper portion should cover or lie directly above less than 60%, and more preferably between 25% and 40%, of the lower portion. The configuration just described allows the present invention to be small and compact, the overall height of such a flea trap being normally less than 3 inches and preferably around 2½ inches. Such a small and compact flea trap may be placed under furniture and in other unobtrusive places in which the prior art traps would not fit.

The present invention may be inexpensively and simply fabricated by use of injection molding and easily, quickly, and reliably assembled for shipment. A pre-assembled, injection molded plastic trap will be very durable. Further, the end user need only load the trap with sticky substance.

The present invention also incorporates a mesh cover for covering sticky substance on the lower portion. This mesh cover has an array of holes formed therein through which fleas can pass but which protects against incidental contact of the sticky substance by animals or others. Animals such as cats that lay on a trap with such a cover will not become stuck to the sticky substance employed to trap fleas.

DETAILED DESCRIPTION OF THE INVENTION

Figure 1:
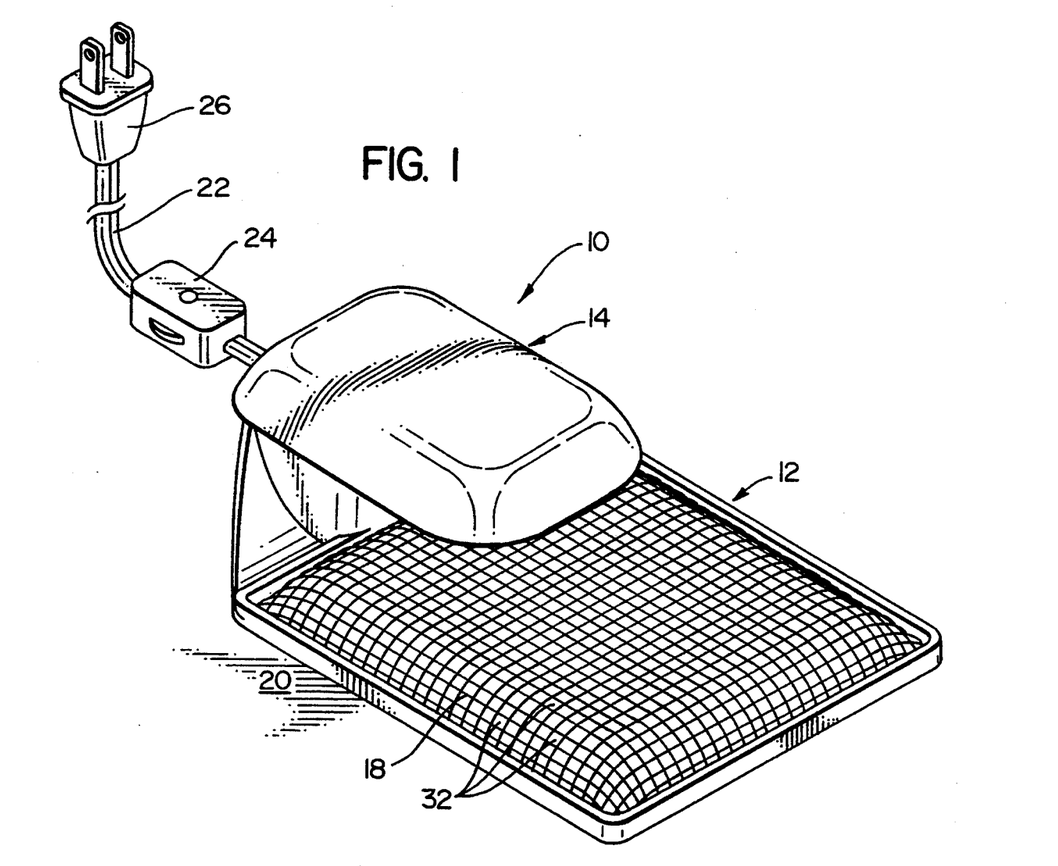
FIG. 1 is perspective view showing a flea trap of the present invention.

Referring now to FIG. 1 of the drawing, depicted at 10 therein is an insect trap constructed in accordance with, and embodying, the principles of the present invention. The flea trap 10 basically comprises a base portion 12, a top portion or light cover 14, a light bulb 16 (FIG. 2), and a mesh cover 18. The flea trap 10 is placed on a surface 20.

An electrical cord 22 having an optional switch 24, a plug 26, and a light socket 28 (FIG. 3) allows a user to selectively apply electrical current to, and thus energize, the light bulb 16. The cord 22, switch 24, plug 26, and light socket 28 are ordinary and will be discussed below only to the extent necessary for a complete understanding of the present invention.

Mounted on the base portion 12 underneath the mesh cover 18 is a sticky substance 30 (FIG. 3) that traps fleas. Specifically, the sticky substance 30 may be any liquid or sheet of material having at least one adhesive side that will adhere to fleas coming into contact therewith. The sticky substance 30 of the exemplary flea trap 10 is a sheet of material having at least one gummy or adhesive side.

The flea trap 10 operates in the following basic manner. The plug 26 is inserted into a wall socket (not shown). The switch 24 is operated to allow current to flow through the cord 22 to the light socket 28. The light socket 28 receives the light bulb 16 in a manner that allows current flowing through the cord 22 to energize the bulb 16.

Figure 2:
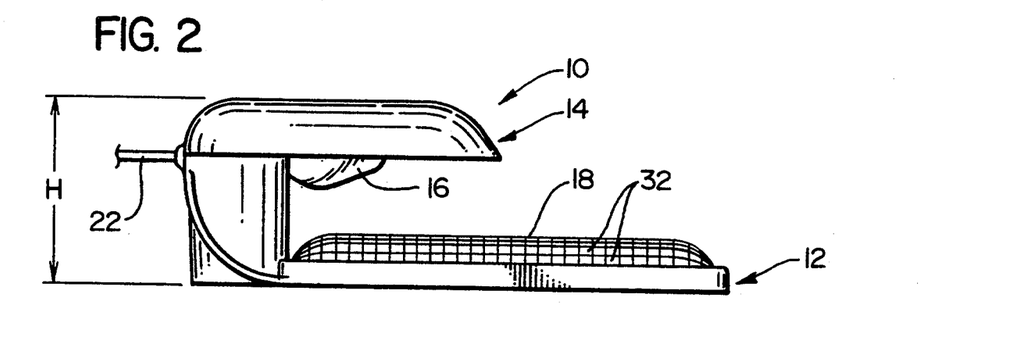
FIG. 2 side plan view of the flea trap depicted in FIG. 1.

As shown in FIG. 2, the light bulb 16 extends below the top portion 14. Accordingly, incandescent light emanating from the energized light bulb 16 illuminates the area surrounding the flea trap 10 and attracts fleas from the surrounding surface 20. Fleas so attracted jump towards the flea trap 10. Fleas jumping towards the light bulb 16 of the flea trap 10 pass through the mesh cover 18 and land on the base portion 12, where they are trapped by the sticky substance 30.

Figure 6:
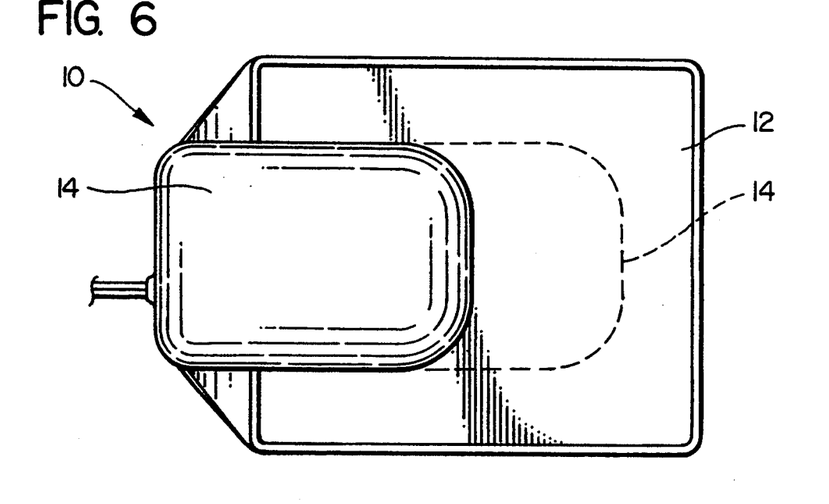
FIG. 6 is a top plan view depicting the relative sizes of the top portion and the base portion of the flea trap depicted in FIG. 1.

An important feature of the present invention is that, as best shown in FIG. 6, the top portion 14 extends over a relatively small section of the base portion 12. Specifically, the top portion 14 should cover no more than 60% of the base portion 12 (generally shown by dotted lines in FIG. 6) and preferably between 25% and 40% thereof. The exemplary top portion 14 covers approximately 30% of the base portion 12 in the flea trap 10. The minimum dimensions of the top portion 14 are generally determined by the need to cover the light bulb 16 from accidental contact that may damage the light bulb 16.

This relatively smaller top portion 14 increases the likelihood that a flea jumping towards the light bulb 16 will fall on the base portion 12 rather than the top portion 14 when jumping from the surface 20 on which the flea trap 10 is placed. Even if the flea lands on the top portion 14, it is likely that: (a) the flea will bounce or slide off of the top portion 14 and onto the sticky substance 30; or (b) the flea will land on the sticky substance 30 when jumping off of the top portion 14.

The relatively small top portion 14 also allows the height of the flea trap 10 to be greatly reduced. Unlike the prior art flea traps, which require that the cover must be a minimum of three inches from the base to allow a flea jumping 3 to 5 inches to pass underneath the cover, the top portion 14 may be located very close to the base portion 12 without blocking the flea's path to the sticky substance 30 because the top portion 14 lies directly above a relatively small area of the base portion 12. For example, the overall height H (FIG. 2) of the exemplary flea trap 10 is two and one-half inches; however, a flea trap constructed in accordance with the principles of the present invention operates effectively at heights between 1½ and 3 inches. Even lower heights might be obtained through the use of smaller and brighter light bulbs.

Another important feature of the present invention is the use of the mesh cover 18 over the sticky substance 30. This cover 18 renders the trap 10 more sanitary by preventing contact with fleas trapped thereon. Further, in testing the flea trap 10, it was found that cats and other animals, attracted by the warmth of the light bulb 16, would lie on top of the trap 10. The mesh cover 18 serves to prevent the fur of such animals from coming into contact with the sticky substance 30 with predictably disadvantageous consequences.

The size of openings 32 in the mesh cover 18 should be large enough to allow passage of the largest fleas without allowing fleas to land on, and subsequently jump off of, the cover 18. These openings should also be small enough to prevent inadvertent contact with the sticky substance 30. Holes with an area of between 0.0088 (square holes 3/32" on a side) and 0.0156 (square holes ⅛" on a side) inches allow passage of fleas without allowing incidental contact with the sticky substance 30. A mesh cover 18 with a mesh of between 6 and 8 openings per linear inch achieves the result just described. The exemplary mesh cover 18 has a mesh of 6 openings per linear inch. The mesh cover can be made of plastic or metal as appropriate.

The details of construction of the base portion 12 and the top portion 14 are of interest because they allow the flea trap 10 to be simply and inexpensively manufactured and assembled. With one exception which will be noted below, the base portion 12 and the top portion 14 are symmetrical about a vertical plane A (FIG. 3) extending from front to back. (As should be clear from the following discussion, the term "front" refers to the lower right in FIGS. 1, 3–5, and 7 and to the right in FIGS. 2 and 6, while the term "back" refers to the upper left in FIGS. 1, 3–5, and 7 and to the left in FIGS. 2 and 6.)

Figure 3:
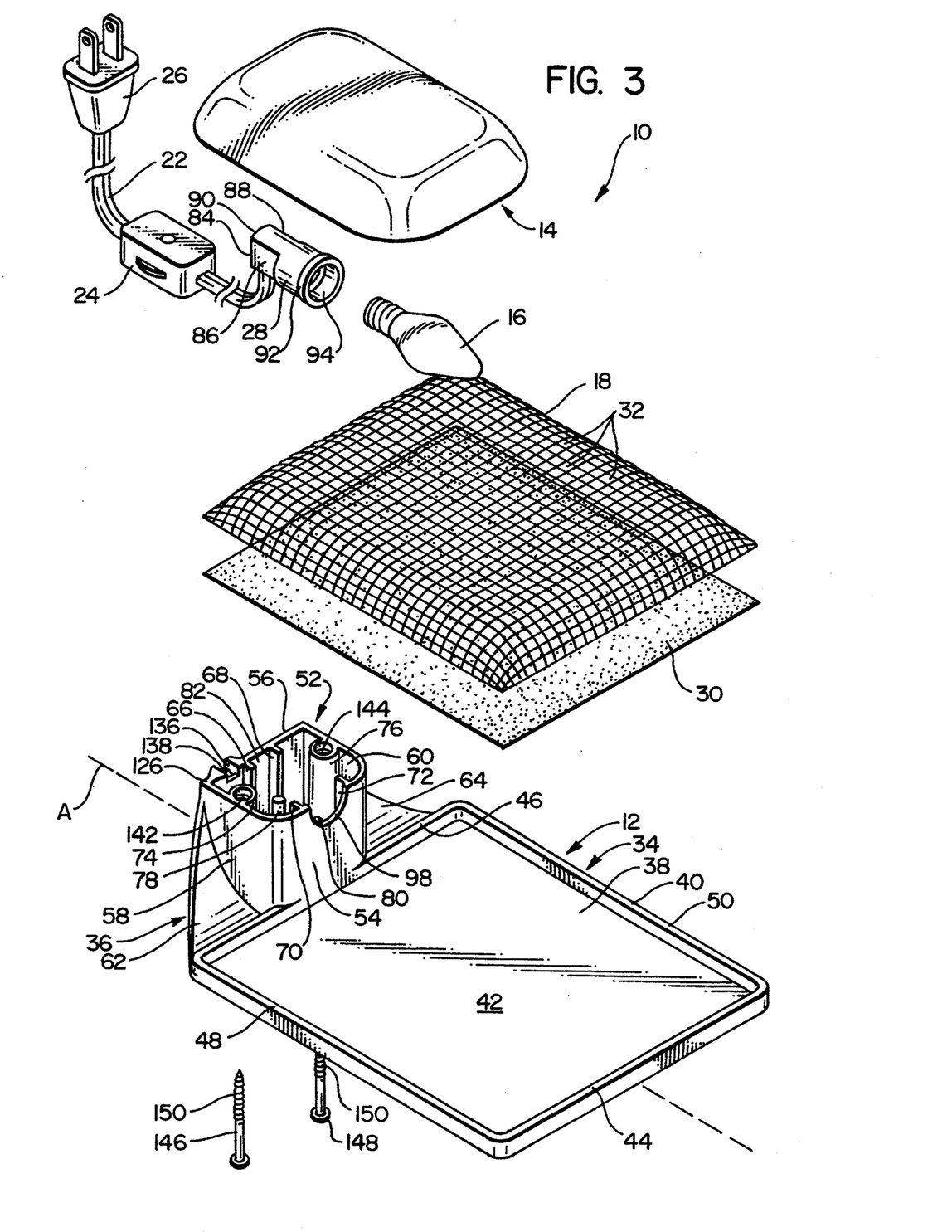
FIG. 3 is an exploded perspective view showing the components of the flea trap depicted in FIG. 1.

As perhaps best shown in FIG. 3, the base portion 12 basically comprises a tray 34 and a support structure 36. The tray 34 essentially comprises a flat panel 38 and a vertical ridge 40 extending around the periphery of the panel 38. The exemplary tray 34 is rectangular and has an upper surface 42.

The tray 34 has front and back edges 44 and 46 that are approximately 5.5 inches in length and left and right side edges 48 and 50 that are approximately 6.25 inches in length. The panel 38 is approximately 3/32 of an inch thick, and the ridge 40 extends upwardly approximately 3/16 of an inch from the panel upper surface 42. While the exact shape and dimensions of the tray 34 and panel 38 are somewhat arbitrary, a tray 34 the upper surface 42 of which has an area of between 20 and 40 square inches is: (a) sufficient for the purposes of trapping fleas given the size of the upper portion 14, as will be discussed in more detail below; and (b) not too large for the purposes of allowing the trap 10 to be placed in an unobtrusive spot on the surface 20. The ridge 40 should extend a minimum of ⅛ of an inch above the tray upper surface 42 for purposes that will become clear below.

In the exemplary flea trap 10, the support structure 36 is integrally formed onto the back edge 46. The support structure 36 comprises a hollow casing 52 with front and back walls 54 and 56 and left and right side walls 58 and 60. The casing 52 is centrally located between the left and right side edges 48 and 50.

Support flanges 62 and 64 extend from the left and right side walls 54 and 56 to the panel back edge 46. As shown in FIG. 2, these support flanges 62 and 64 are curved and are approximately horizontal where they contact the back panel edge 46 and approximately vertical near the cover 14. These support flanges 62 and 64 greatly increase the ability of the top portion 14 to withstand loads; a person standing on this top portion 14 will not ordinarily cause catastrophic failure of the trap 10.

Formed within the interior of the casing 52 are: (a) a pair of vertically extending left and right back rails 66 and 68; (b) a pair of left and right front rails 70 and 72; (c) a pair of left and right screw housings 74 and 76; (d) a support post 78; and (e) a support rib 80.

The left and right back rails 66 and 68 are mounted on the inner surface of the back wall 56. These back rails 66 and 68 define a slot 82 which receives a back portion 84 of the above-mentioned light socket 28. This portion 84 (FIG. 3) has parallel left and right flat surfaces 86 and 88 (FIG. 3). When the light socket 28 is assembled within the casing 52, the spacing of the back rails 66 and 68 is such that the back portion 84 is snugly received in the slot 82, with the socket flat surfaces 86 and 88 abutting the back rails 66 and 68 corresponding thereto. The cord 22 extends downwardly from the light socket 28 in a manner that allows a back surface 90 (FIG. 3) of the light socket 28 to abut the inner surface of the back wall 56.

The front rails 70 and 72 are located on the inner surface of the casing front wall 54. These rails 70 and 72 are spaced apart a distance approximately the same as the diameter of a cylindrical ridge 92 (FIG. 3) around a light bulb-receiving opening 94 (FIG. 3) of the light socket 28. When the light socket 28 is assembled to the casing 52, the ridge 92 is snugly received between the front rails 70 and 72.

The support post 78 extends upwardly from the interior surface of a bottom wall 96 (FIG. 4) of the casing 52. The support rib 80 vertically extends along the casing front wall 54 midway between the front rails 70 and 72. The post 78 and rib 80 contact the underside of the light socket 28 to space the light socket 28 a given distance from the casing bottom wall 96. Specifically, the light socket 28 is so spaced from the bottom wall 96 that the light bulb-receiving opening 94 thereof is generally co-axially aligned with the axis of a cut-away 98 formed in the casing front wall 54. This cut-away 98 forms part of a circular opening as will be described in further detail below.

Figure 5:
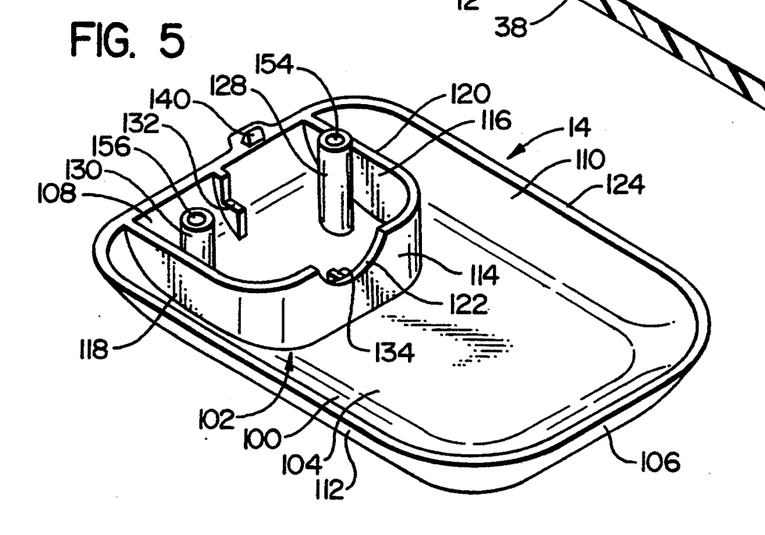
FIG. 5 is an inverted perspective view showing the details of construction of a top portion of the present invention.

Before continuing with the description of the base portion 12, a description of the top portion 14 is in order. As best shown in FIG. 5, this top portion 14 basically comprises a dish-like protective cover 100 and a casing lid 102. The protective cover 100 comprises top, front and back, and left and right side walls 104, 106, 108, 110, and 112. (When referring to FIG. 5, it should be noted that the top portion 14 is inverted so the term "top" refers to the lower side in FIG. 5 and the terms "left" and "right" are switched with referring to FIG. 5.) These walls 104–112 are slightly curved or warped, with the transition regions between the top wall 104 and the other walls 106–112 having a slightly greater radius of curvature than the curvature of the walls 104–112 themselves. The front and back walls 106 and 108 and the left and right side walls 110 and 112 generally form obtuse angles with the top wall 104. While the exact shape of these walls 104–112 is arbitrary, some curvature is desirable because such curvature encourages fleas to slide or bounce off of the cover 100 onto the sticky substance 30 below.

Figure 4:
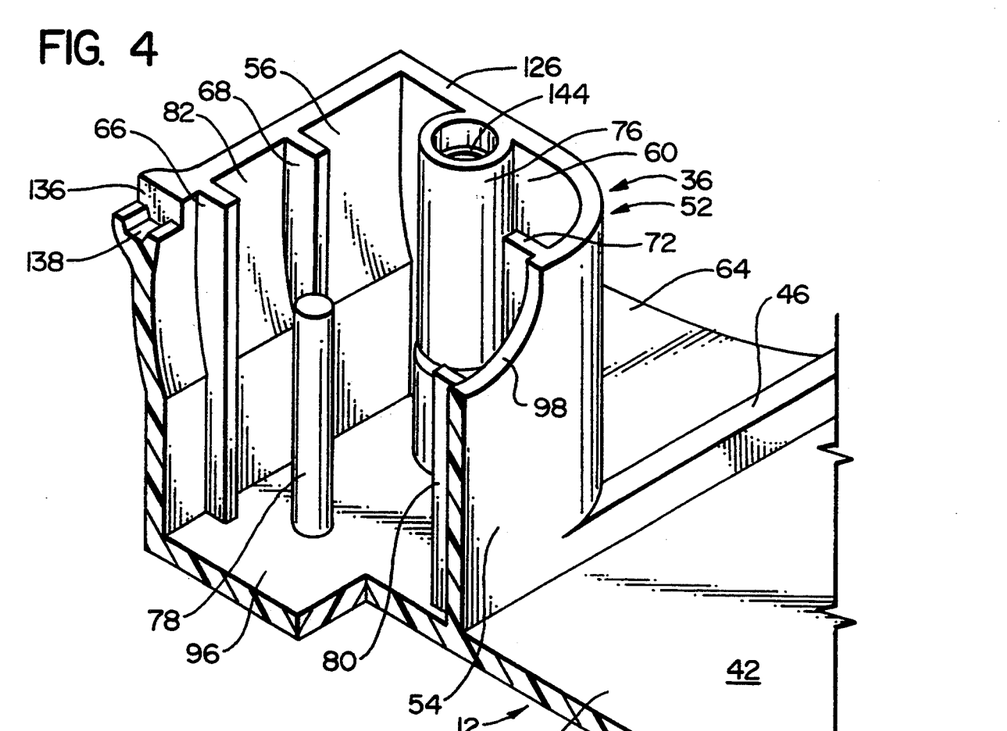
FIG. 4 is a partial, cut-away perspective view showing the internal construction of a casing of the present invention.

The casing lid 102 comprises front and left and right side portions 114, 116, and 118 and is attached to inner surfaces of the top wall 104 and the cover back wall 108. Lower surfaces of these portions 114, 116, and 118 and the cover back wall 108 are generally co-planar and form an inner peripheral edge 120. This inner edge 120 resides in a horizontal plane except where a cut-away 122 is formed in the lid front portion 114. An outer peripheral edge 124 formed by lower surfaces of the walls 106–112 is co-planar with the peripheral edge 120. For reasons that will become clear below, as generally shown in FIG. 4 the outline of the inner peripheral edge 120 is identical to that of an upper peripheral edge 126 formed by upper surfaces of the casing walls 54–60.

Left and right screw sockets 128 and 130 extend upwardly from the inner surface of the top wall 104 adjacent to the left and right lid portions 116 and 118, respectively. These screw sockets 128 and 130 are cylindrical in the exemplary trap 10 and extend slightly beyond the peripheral edges 120 and 124. The distance between the axes of these screw sockets is the same as that between the axes of the screw housings 74 and 76 (FIG. 3). Additionally, a back securing fin 132 projects from the inner surface of the cover back wall 108, while a front securing fin 134 projects from inner surface of the front lid portion 114.

As mentioned above, the base portion 12 and top portion 14 are generally symmetrical with one exception. As seen in FIG. 4, a notch 136 having a groove 138 set therein is formed in the back wall 56 of the casing 52, while a corresponding projection 140 (FIG. 5) is formed on the back wall 108 of the cover 100. The notch 136 is located to one side, in this case the left side, of the left back rail 66. Similarly, the projection 140 is located to the left of the rear fin 132.

The above-described design of the base portion 12 and top portion 14 are particularly suited to injection molding, and the exemplary base and top portions 12 and 14 are thus preferably constructed from injection molded plastic.

The base portion 12 and top portion 14 constructed as described above are assembled together with the light socket 28 in the following manner. Initially, the socket is placed into the casing 52: (a) with its rear portion 84 between the back rails 66 and 68; (b) with its cylindrical ridge 92 between the front rails 70 and 72; and (c) such that it rests on the support post 78 and the support rib 80. The cord 22 is then placed in the notch 136 with the switch 24 outside of the casing 52.

The top portion 14 is next placed onto the base portion 12 so that the inner peripheral edge 120 of the casing lid 102 sits on the upper peripheral edge 126 of the casing 52. At this point, the upper and lower cut-aways 122 and 98 align to form a circular hole that is generally co-axially aligned with the bulb-receiving opening 94 of the light socket 28. The front and rear fins 134 and 132 contact the light socket 28, while the ends of the screw sockets 128 and 130 extend into, and are stopped by, constrictions 142 and 144 (FIG. 3) within the screw housings 74 and 76. The light socket 28 is thus supported within the casing 52. It should be noted that the projection 140 presses the cord 22 into the groove 138; the cord is thus prevented from being withdrawn from the interior of casing 52 when ordinary loads are applied to the cord 22.

Screws 146 and 148 (FIG. 3) are then inserted through the bottom of the casing 52 and through the screw housings 74 and 76. Threaded portions 150 and 152 of the screws 146 and 148 extend into holes 154 and 156 (FIG. 5) in the screw sockets 128 and 130. By turning the screws 146 and 148, the threaded portions 150 and 152 engage the screw sockets 128 and 130 and thus securely attach the top portion 14 to the base portion 12.

When assembled, the cover 100 of the top portion 14 covers less than 60%, and preferably between 25% and 40% of the surface 42 on the base portion 12; the cover 100 covers approximately 30% of the base portion 12 in the exemplary flea trap 10.

The flea trap 10 is shipped in the assembled form shown in FIG. 1. Upon receipt, the user need merely remove the mesh cover 18 from its position on the base portion 12 and place the sheet of sticky substance 30 onto the surface 42 of the base panel 38. The mesh cover 18 is then replaced.

It should be noted that the mesh cover 18 is so bent around its edges that these edges contact the surface 42 and its center portion extends at least ¼ of an inch above the surface 42. The center of the exemplary mesh cover 18 extends approximately ½ inch above the surface 42. Also, the edges of the mesh cover 18 so contact the perimeter ridge 40 that friction therebetween prevents inadvertent removal of the cover 18.

The light bulb 16 may then be energized to attract fleas to the sticky substance 30 as described above.

It should be clear that the present invention may be embodied in forms other than that described above. For example, the mesh cover 18 may be an injected molded piece such as that indicated at 158 in FIGS. 7 and 8. Such an injection molded cover 158 is normally provided with at least one foot 160 on the underside thereof to prevent the cover 158 from contacting more than a very small portion of the sticky substance 30. The cover 158 may thus be easily removed because it does not firmly adhere to the substance 30. The holes 158a in this cover 158 are between 3/32" and ⅛" on a side.

Figure 7:
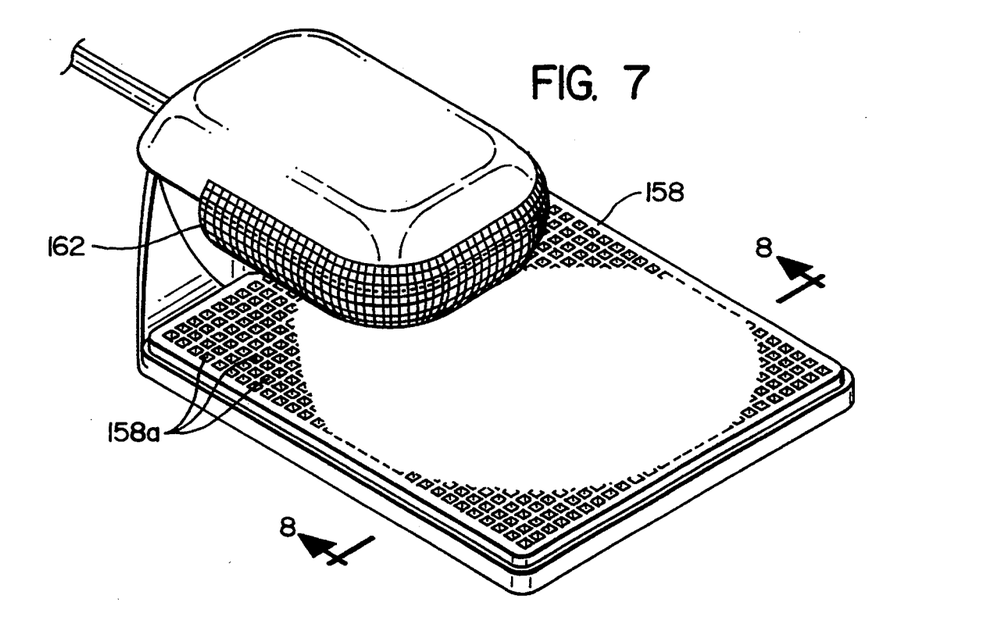
FIG. 7 is a perspective view showing a flea trap of the present invention having a screen over the light source thereof.
Figure 8:
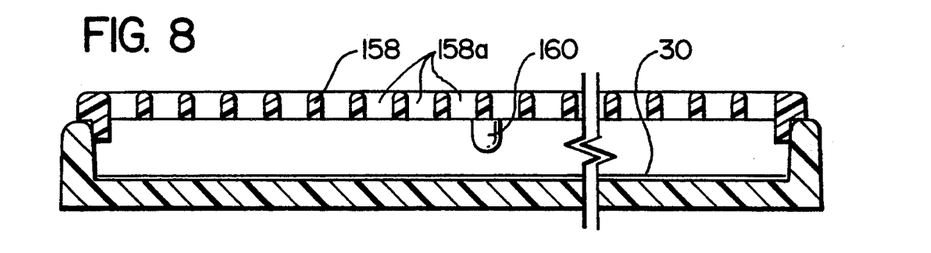
FIG. 8 is a side, plan cut-away view showing an injection molded cover therefore.

Additionally, it may be preferable to arrange a perforated screen such as that depicted at 162 in FIG. 7 over the light bulb 16. Such a screen 162 has been found to enhance the ability of the apparatus 10 to attract fleas. The screen 162 may optionally be replaced by or used in conjunction with a filter designed to pass green-yellow light having a wavelength of between 510 and 550 nanometers, as light in this range of wavelengths has been shown to be particularly attractive to cat fleas.

Attached hereto in Appendix A are a series of tables containing test data illustrating the results of a series of tests performed with a flea trap constructed as described above. Initially, the test set-up used to obtain the results in the Tables in Appendix A will be described. Then, each of these tables will be briefly discussed and the significance of the results contained therein will be explained.

These tests were conducted in arenas having various dimensions. Fleas were placed in the the arena so that they were at equal distance from the positions at which the trapping devices being tested were located; no traps were favored by the test set-up, and often the locations of the traps under test were switched to ensure testing fairness. At the end of a time period (i.e., 24 hours), the fleas caught by traps at each of the positions were counted, as were the dead fleas that were not trapped. The total of fleas trapped plus dead fleas is 100% of the fleas released. The flea traps tested all employed a light for attracting fleas and a sticky material for trapping fleas attracted by the light.

Table A in Appendix A illustrates the efficacy of employing a light source to attract fleas; a flea trap 10 as described above with its bulb "ON" caught 85% of the fleas released, while a trap 10 with its bulb "OFF" did not catch any fleas. 15% of the fleas died and were not trapped.

Tables B and C compare a flea trap 10 having a clear green light bulb (as described in the patents to Justice and Williams discussed above) with a flea trap 10 with a clear light bulb as described in connection with the present invention. In one test (Table B), the trap with a clear bulb caught 50.0% of the fleas released, while the trap with the green bulb caught 37.5% of the fleas released, with 12.5% of the fleas dying. In another test (Table C) the trap with a clear bulb caught 41.7% of the fleas released, while the trap with the green bulb caught only 25% of the fleas released, and 33.3% of the fleas released died without being trapped. In both cases, the green light showed no superiority to the clear light of the present invention and in fact proved to be less effective than the clear light.

In Table D, a plurality of different colored light bulbs are compared. The clear bulb was by far the most effective at attracting fleas, attracting 63.2% of the fleas released.

In Table E, test data obtained from light bulbs of different wattages are compared. Five and seven watt clear bulbs showed no appreciable difference in flea attracting ability.

Table F compares a flea trap such as the trap 10 (the FLEA TRAP) described above with a commercially available flea trap sold under the tradename HAPPY JACK. Even though the flat panel 38 of the FLEA TRAP had approximately one-half of the trapping area of the similar portion of the HAPPY JACK, the FLEA TRAP caught the same number of fleas as the HAPPY JACK when it was in the first postion and over four times the number of fleas caught by the HAPPY JACK when it was in the second position.

Table G compares the FLEA TRAP with a trap sold under the name of FLEA STOP. In the first position, the FLEA TRAP caught all of the fleas, while in the second position, the FLEA TRAP caught 78.6% of the fleas as compared to 14.2% for the FLEA STOP.

Table H compares the FLEA TRAP with a product marketed under the name ULTIMATE. In this test, the flea trap caught 72.7% of the fleas released, while the ultimate caught only 27.3% of the fleas released.

The present invention is thus clearly more effective at attracting and trapping fleas than the other methods currently available on the market.

The above-described example is to be considered in all respects illustrative and not restrictive, the scope of the invention being indicated by the appended claims rather than the foregoing description. All changes that come within the meaning and scope of the claims are intended to be embraced therein.

TABLE A

| APPENDIX A ATTRACTION TO LIGHT SOURCE | |
|---|---|
| BULB ON | 85.0 |
| BULB OFF | 0.0 |
| PERCENT DEAD | 15.0 |

TABLE B

| GREEN VERSUS CLEAR LIGHT BULB | |
|---|---|
| CLEAR BULB | 50.0 |
| CLEAR GREEN BULB | 37.5 |
| PERCENT DEAD | 12.5 |

TABLE C

| GREEN VERSUS CLEAR LIGHT BULB | |
|---|---|
| CLEAR BULB | 41.7 |
| CLEAR GREEN BULB | 25.0 |
| PERCENT DEAD | 33.3 |

TABLE D

| COMPARISON OF DIFFERENT COLORED LIGHT BULBS | |
|---|---|
| CLEAR BULB | 63.2 |
| CLEAR YELLOW BULB | 15.8 |
| COATED WHITE BULB | 10.5 |
| CLEAR RED BULB | 5.3 |
| CLEAR GREEN BULB | 0.0 |
| COATED BLUE BULB | 0.0 |
| CLEAR BLUE BULB | 0.0 |
| COATED YELLOW BULB | 0.0 |
| PERCENT DEAD | 5.2 |

TABLE E

| LIGHT BULB WATTAGE COMPARISON | |
|---|---|
| 5 WATT CLEAR BULB | 37.5 |
| 7 WATT CLEAR BULB | 37.5 |
| PERCENT DEAD | 25.0 |

TABLE F

| TRAP | Position #1 24 Hours | Position #1 48 Hours | Position #1 TOTAL | Position #2 24 Hours |
|---|---|---|---|---|
| THE FLEA TRAP | 30.7% | 7.8% | 38.5% | 81.8% |
| HAPPY JACK | 30.7% | 7.8% | 38.5% | 18.2% |
| DEAD FLEAS | 0.0% | 23.0% | 23.0% | 0.0% |

TABLE G

| TRAP | Position #1 24 Hours | Position #2 24 Hours |
|---|---|---|
| THE FLEA TRAP | 100.0% | 78.6% |
| FLEA STOP | 0.0% | 14.2% |
| DEAD FLEAS | 0.0% | 7.2% |

TABLE H

| TRAP | Position #1 24 Hours |
|---|---|
| THE FLEA TRAP | 72.7% |
| ULTIMATE | 27.3% |
| DEAD FLEAS | 0.0% |

I claim:

1. An apparatus for trapping fleas, comprising:
   a. a base portion having a trapping surface;
   b. adhesive means placed on the trapping surface;
   c. means for so mounting a light source above the trapping surface that fleas are attracted to the trapping surface and trapped by the adhesive means, where the mounting means extends over no more than 60% of the trapping surface; wherein
   d. the mounting means comprises:
      i. a support structure attached to the base portion along a first section of the peripheral edge of the trapping surface,
      ii. a cover means for covering the light source, the cover means being attached to the support structure such that the cover means extends over the trapping surface from the first section of the peripheral edge of the trapping surface, and
      iii. at least one side member connected between the base portion and the support structure, where the support structure comprises first and second side walls, where the at least one side member is substantially horizontal at the point where the side member is connected to the base portion and substantially vertical at the point where the side member is connected to the support structure.

2. The apparatus as recited in claim 1, in which the mounting means extends over between 25% and 40% of the trapping surface.

3. The apparatus as recited in claim 1, in which the trapping surface is flat and horizontally aligned, further comprising perforated means arranged adjacent and substantially parallel to the trapping surface for covering the trapping surface in a manner that allows fleas to reach the trapping surface but prevents incidental contact therewith.

4. An apparatus as recited in claim 1, in which the uppermost point on the cover means being located no more than 3 inches above the trapping surface.

5. An apparatus as recited in claim 3, further comprising at least one member for preventing the perforated means from contacting the adhesive means.

6. The apparatus as recited in claim 1, further comprising perforated means for covering at least a portion of the light source.

* * * * *